United States Patent
Chou (10) Patent No.: US 8,086,804 B2
(45) Date of Patent: Dec. 27, 2011

(54) METHOD AND SYSTEM FOR OPTIMIZING PROCESSOR PERFORMANCE BY REGULATING ISSUE OF PRE-FETCHES TO HOT CACHE SETS

(75) Inventor: Yuan C. Chou, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 682 days.

(21) Appl. No.: 12/237,088

(22) Filed: Sep. 24, 2008

(65) Prior Publication Data

US 2010/0077154 A1 Mar. 25, 2010

(51) Int. Cl.
*G06F 12/00* (2006.01)
(52) U.S. Cl. ......................................... 711/137; 711/118
(58) Field of Classification Search ........................ None
See application file for complete search history.

(56) References Cited

U.S. PATENT DOCUMENTS 7,526,616 B2 * 4/2009 Dimpsey et al. ............... 711/137
2005/0114606 A1 * 5/2005 Matick et al. .................. 711/134

OTHER PUBLICATIONS

SearchDataCenter.com, "multi-core processor" Oct. 14, 2004 http://searchdatacenter.techtarget.com/definition/multi-core-processor.*

* cited by examiner

*Primary Examiner* — Sanjiv Shah
*Assistant Examiner* — Daniel Tsui
(74) *Attorney, Agent, or Firm* — Osha • Liang LLP (57) ABSTRACT

A method for pre-fetching data. The method includes obtaining a pre-fetch request. The pre-fetch request identifies new data to pre-fetch from memory and store in a cache. The method further includes identifying a set in the cache to store the new data and identifying a value of a hotness indicator for the set. The hotness indicator value defines a number of replacements of at least one line in the set. The method further includes determining whether the value of the hotness indicator exceeds a predefined threshold, and storing the new data in the set when the value of the hotness indicator does not exceed the pre-defined threshold.

15 Claims, 7 Drawing Sheets

METHOD AND SYSTEM FOR OPTIMIZING PROCESSOR PERFORMANCE BY REGULATING ISSUE OF PRE-FETCHES TO HOT CACHE SETS

BACKGROUND

The functions of a computer system are achieved by a processor executing instructions. Both the instructions and the data used in the execution of the instructions are stored in memory on the computer system. Accordingly, in order to execute the instructions, the processor must first obtain the instructions and the data from memory. However, the latency, or time delay, to access memory may be unduly long and adversely affect efficient processing.

To minimize latency, the typical computer system uses a memory hierarchy. Specifically, the memory hierarchy divides the storage of the instructions and data into components. For example, the components often include processor cache, main memory, and secondary storage. The higher a component is in the memory hierarchy, the closer the component is to the processor, the less instructions and/or data that is stored by the component, and the faster the access to the instructions and/or data stored in the component. Conversely, the lower the component is in the memory hierarchy, the more instructions and/or data that can be stored by the component, the farther the component is from the processor, and the slower the access to the data stored in the component. For example, the cache, which is generally located on the same chip as the processor, is higher than secondary storage in the memory hierarchy. Accordingly, the cache stores less instructions and/or data and is faster to access than secondary storage.

The typical cache is divided into lines. The lines of the cache are grouped into sets. Each set has disjoint groups of memory addresses corresponding to the set. Data elements with a memory address in the group map to the set. Accordingly, when a data element is stored in the cache, the data element is stored any line of the set mapped to by the memory address of the data element. Thus, the data element can only be stored in any line of a particular set. The data element may be an instruction or data accessed by a program.

When a processor executes an instruction that requires data, the instruction and data are obtained according to the memory hierarchy. Specifically, if the instruction and/or data is not in the cache, then a determination is made as to whether the instruction and/or data is in main memory. If the instruction and/or data is not in the main memory, then a determination is made as to whether the instruction and/or data is in secondary storage. If the instruction and/or data is in secondary storage, then the instruction and/or data is loaded into the main memory, and then loaded into the appropriate cache(s).

In order to further minimize the latency, instructions and/or data may be pre-fetched into the cache. Specifically, instructions and/or data are obtained from memory and stored into the cache before the instruction/data is needed by the processor.

For example, in a scenario in which data element A is stored next to data element B which is stored next to data element C, a compiler of a program may identify that data elements B and C are generally accessed in the program shortly after data element A is accessed in the program. Accordingly, the compiler may embed data pre-fetch instructions into the program after each instruction that uses data element A. The data pre-fetch instructions instruct the processor to pre-fetch data elements B and C. In general, the compiler cannot be certain that both data elements B and C are needed after every pre-fetch of data element A. As shown, the pre-fetch of data elements B and C are based on the observation that the access to data elements B and C generally follow an access to data element A. Instead of depending on a compiler to embed pre-fetch instructions in a program, a processor may also implement a hardware pre-fetcher. The hardware pre-fetcher attempts to recognize patterns in the sequence of instructions and/or data accessed by a program and bring in instructions and/or data into the processor's caches just before they are accessed by the program.

Pre-fetching data can add a latency cost to executing a program. As discussed above, the cache is smaller than main memory. Moreover, the storage in the cache typically is less than the amount of storage required by the program. Accordingly, when new instruction/data is pre-fetched, the new instruction/data typically replaces previously existing instruction/data in the cache. If the pre-fetch is inaccurate (e.g., the new instruction/data is not required at all and/or the previously existing instruction/data replaced by the new instruction/data is required before the new data is required), then an additional cost is incurred to reload the previously existing instruction/data back into the cache.

SUMMARY

In general, in one aspect, the invention relates to a method for pre-fetching data. The method includes obtaining a pre-fetch request. The pre-fetch request identifies new data to pre-fetch from memory and store in a cache. The method further includes identifying a set in the cache to store the new data and identifying a value of a hotness indicator for the set. The hotness indicator value defines a number of replacements of at least one line in the set. The method further includes determining whether the value of the hotness indicator exceeds a predefined threshold, and storing the new data in the set when the value of the hotness indicator does not exceed the pre-defined threshold.

In general, in one aspect, the invention relates to a computer system that includes a processor, a cache, and memory. The computer system is configured to obtain a pre-fetch request. The pre-fetch request identifies new data to pre-fetch from the memory and store in the cache. The computer system is further configured to identify a set in the cache to store the new data and identify a value of a hotness indicator for the set. The hotness indicator value defines a number of replacements of at least one line in the set. The computer system is further configured to determine whether the value of the hotness indicator exceeds a predefined threshold, and store the new data in the set when the value of the hotness indicator does not exceed the pre-defined threshold.

In general, in one aspect, the invention relates to a chip that includes a plurality of cores and a cache. The chip is configured to obtain a pre-fetch request. The pre-fetch request identifies new data to pre-fetch from the memory and store in the cache. The chip is further configured to identify a set in the cache to store the new data, and identify a value of a hotness indicator for the set. The hotness indicator value defines a number of replacements of at least one existing line in the set. The chip is further configured to determine whether the value of the hotness indicator exceeds a predefined threshold, and store the new data in the cache when the value of the hotness indicator does not exceed the pre-defined threshold.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for determining when to pre-fetch data. For the purposes of the description, the term data may include instructions and/or data used by the instructions. Embodiments of the invention identify hot sets in the cache. A hot set is a set that has lines with data that are frequently replaced. Specifically, a hot set is a set that maps to a disproportionate number of memory addresses for data used by one or more programs in execution. In one or more embodiments of the invention, a hot set is susceptible to continual swapping of data in lines. Specifically, existing data in lines of a hot set may be replaced by pre-fetched data, even though the existing data required before the pre-fetched data is required.

In order to identify hot sets, embodiments of the invention associate a hotness indicator field with each set. Whenever a line in a set is replaced, the hotness indicator field is updated to count the number of times that any line in the set is replaced. If the value of the hotness indicator field exceeds a pre-defined threshold, then the data is not pre-fetched. Periodically, the hotness indicator field for each set is reset.

Pre-fetches of data are instigated by a pre-fetch request. A pre-fetch request may be a pre-fetch instruction or a hardware pre-fetch. For example, when compiling a program, a compiler may embed pre-fetch instructions into the program. Similarly, while executing a program, a hardware device may issue a hardware pre-fetch to pre-fetch data.

For the purposes of the description below, the cache may be divided into a single set (i.e., the entire cache is a single set), multiple sets that each include more than one line, or each line may be a separate set.

Figure 1:
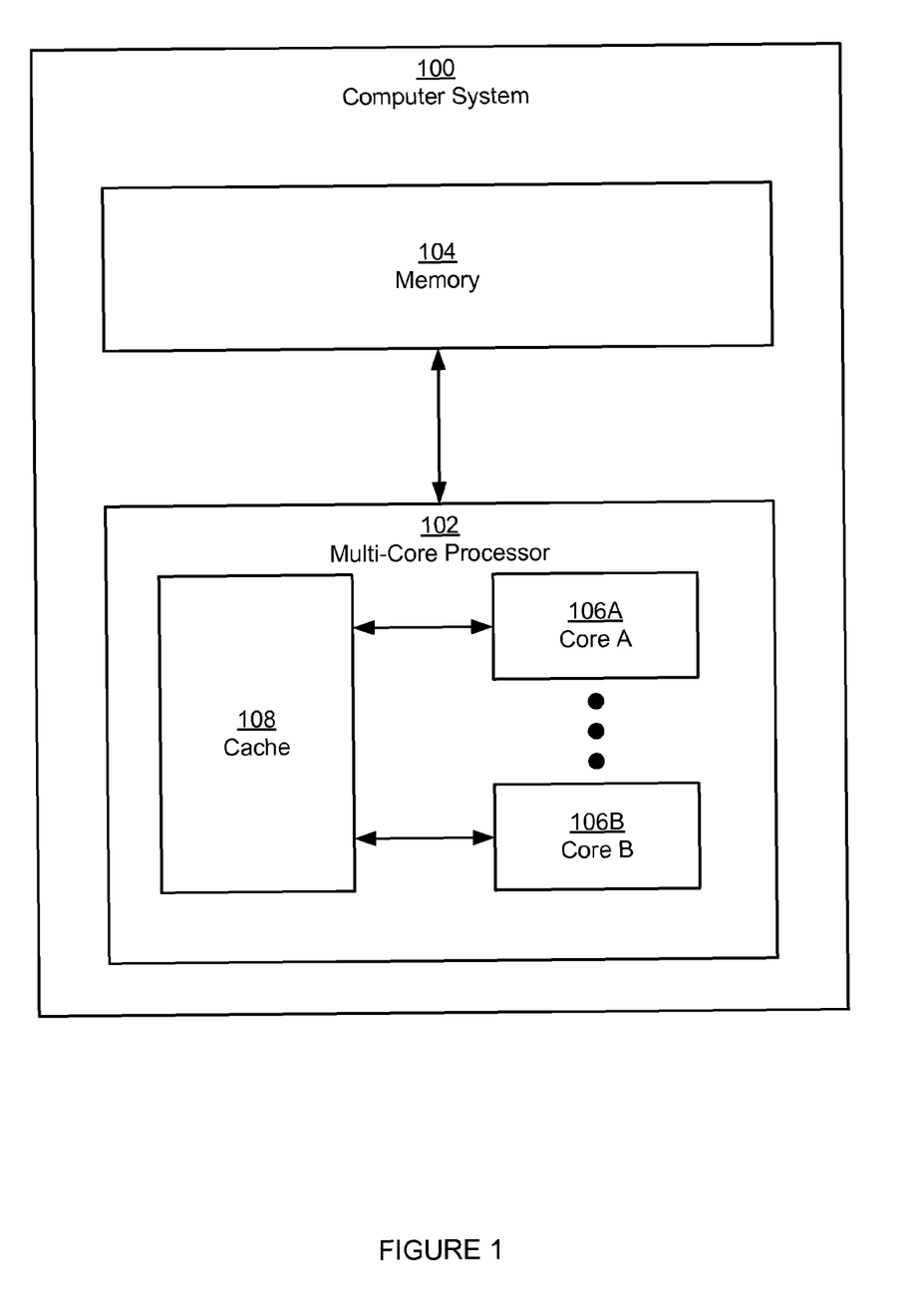
FIG. 1 shows a computer system in accordance with one or more embodiments of the invention.

FIG. 1 shows a computer system in accordance with one or more embodiments of the invention. As shown in FIG. 1, a computer system (100) includes a multi-core processor (102) and memory (104). The memory (104) may be random access memory (RAM), flash memory, hard disk, an optical drive such as a compact disk drive or digital video disk (DVD) drive, a flash memory stick, or any other type of storage.

The multi-core processor (102) is a chip that includes multiple cores (106) and a cache (108). The cache (108) is a temporary storage device for data. Further, the cache (108) is higher in the memory hierarchy than main memory. In one or more embodiments of the invention, the cache (108) is located on the same chip as the cores (106) of the multi-core processor (102). The cache (108) is discussed below and in FIGS. 2 and 3.

A core (106) is a logical hardware device on the multi-core processor (102) that includes functionality to process instructions. The cores (106) process instructions in parallel with other cores (106) using the cache (108) (discussed below and in FIGS. 2 and 3). Accordingly, more than one core may access the same cache (108) at the same time. For example, core A (106A) may use data from the same set in the cache as core B (106B).

Although not shown in FIG. 1, the processor may be a single core processor rather than a multi-core processor. Additionally, the computer (100) may also include an input device, such as a keyboard, a tough screen or touch pad, a mouse, a microphone, or other unit for inputting data. Further, the computer system (100) may include an output device, such as a monitor (e.g., a liquid crystal display (LCD), a plasma display, or cathode ray tube (CRT) monitor). The computer system (100) may be connected to a network (e.g., a local area network (LAN), a wide area network (WAN) such as the Internet, or any other similar type of network) via a network interface connection (not shown). Those skilled in the art will appreciate that many different types of computer systems exist (e.g., desktop computers, laptop computers, servers, personal digital assistants, embedded devices, smart phone, etc.), and the aforementioned components of the computer system (100) may take other forms.

Figure 2:
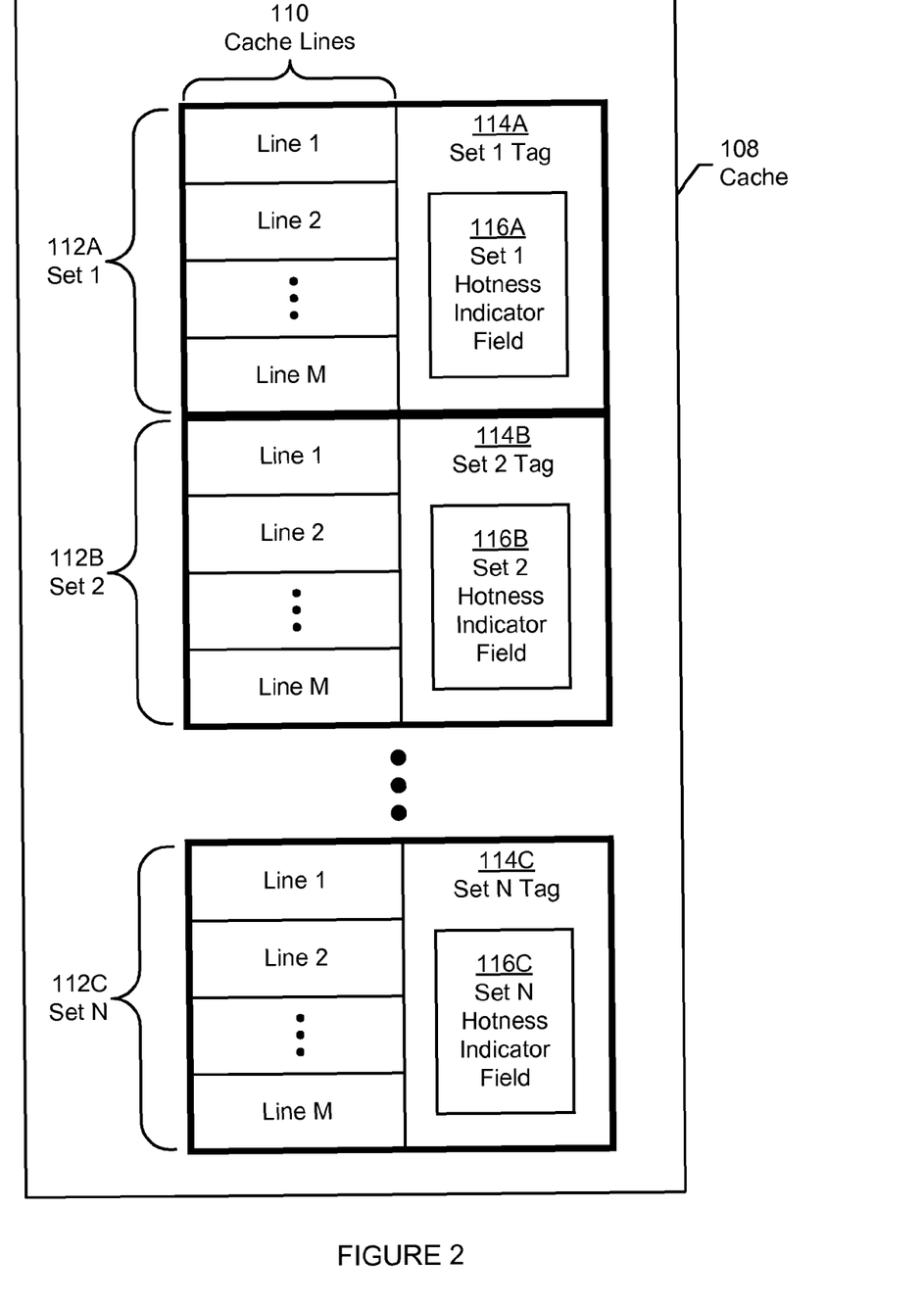
FIGS. 2 and 3 show schematic diagrams of a cache in accordance with one or more embodiments of the invention.

FIG. 2 shows a schematic diagram of the cache (108) in accordance with one or more embodiments of the invention. As shown in FIG. 2, the cache includes multiple lines (110). Each line (110) of the cache provides storage for storing a number of contiguous bytes from memory. The lines (110) of the cache are grouped into sets (112). As shown in FIG. 1, for a cache that has N number of sets and N multiplied by M number of lines, the first M lines of the cache are in set 1, the second M lines of the cache are in set 2, and the last M lines of the cache are in set N.

Each set (112) maps to a disjoint group of memory addresses. For example, set 1 (112) may map to memory addresses starting with 00. Set 2 (112B) may map to memory addresses starting with 01. Set N (112C) may map to memory addresses starting with 11. In the example, if a data element has the address 01111 . . . 00, then the data element is stored in set 2 (112B). As another example, if the data element has the address 1101010 . . . 01, then the data element is stored in a line of set N (112C). Alternatively, the sets may be mapped to non-contiguous groups of memory addresses. For example, the mapping may be based on a hash function.

In one or more embodiments of the invention, each set (112) has a corresponding tag (114) that is stored with the set (112). The tag (114) provides metadata about the set (112). Amongst other possible metadata, the tag (114) includes a hotness indicator field (116). The hotness indicator field (116) corresponding to a set (112) identifies the number of times data, in any line (110) in the set (112), is replaced.

For example, in a scenario in which the data in line 1 of set 2 (112B) is replaced twelve times and the data in the other lines are not replaced, the value of the set 2 hotness indicator field (116B) identifies that data in the set 2 (112B) is replaced 12 times. As another example, if data in line 1 of set 2 (112B) is replaced 8 times, data in line two of set 2 (112B) is replaced 3 times, data in line M of set 2 (112B) is replaced 2 times, and data in no other lines is replaced, then the value of the set 2 hotness indicator field (116B) identifies that data in the lines of set 2 (112B) is replaced 13 times (i.e., 8 times+3 times+2 times=13 times).

Figure 3:
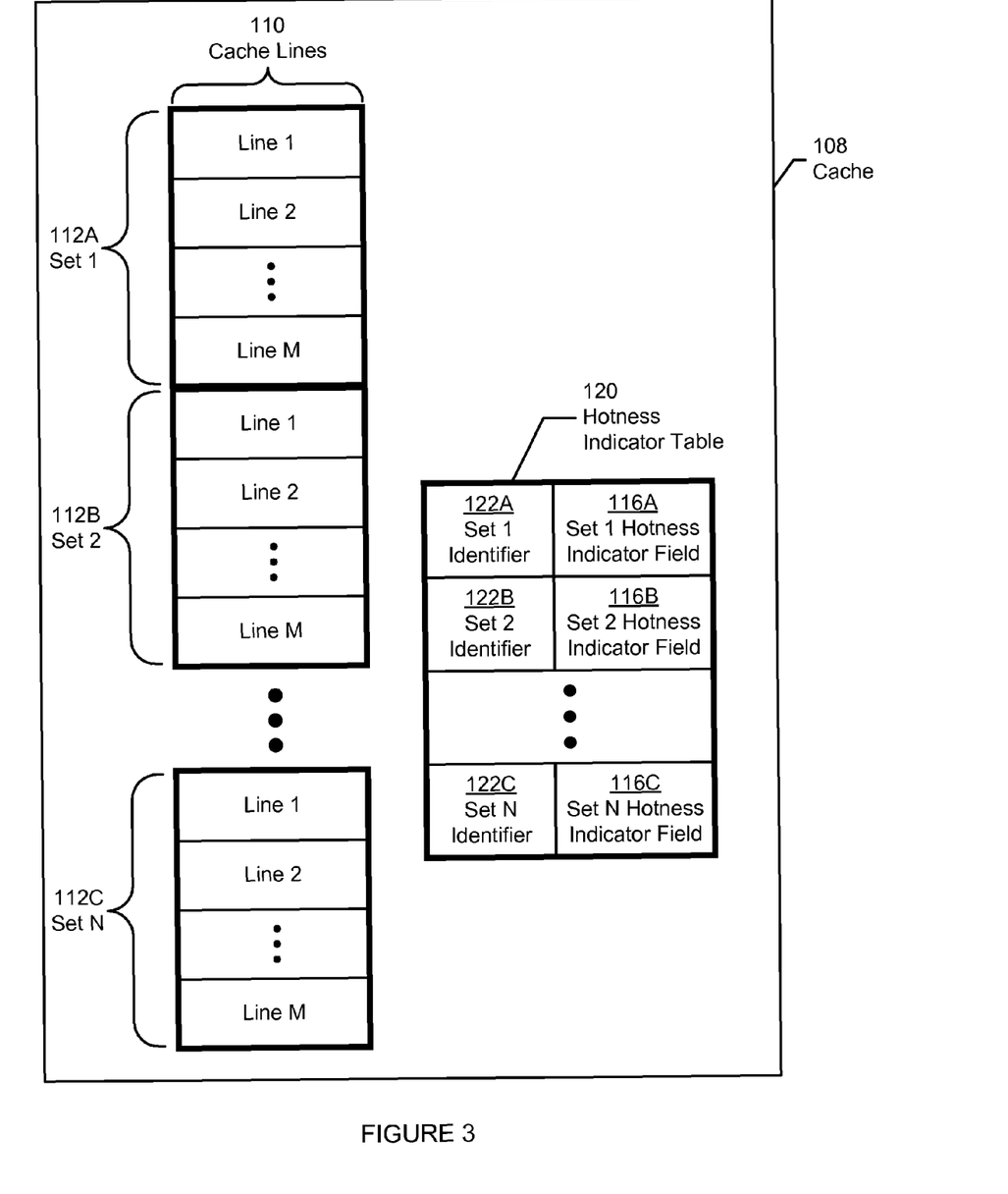

FIG. 3 shows a schematic diagram of the cache (108) in accordance with one or more embodiments of the invention. As shown in FIG. 3, as an alternative to the hotness indicator field (116) in tags corresponding to the set (112), the hotness indicator field (116) may exist in a separate hotness indicator table (120). In one or more embodiments of the invention, the hotness indicator table is located separate from the sets (112) on the cache. In particular, the hotness indicator table may be located in a dedicated block of the cache.

In one or more embodiments of the invention, the hotness indicator table (120) includes an entry for each set (112). An entry includes a set identifier field (122) and a hotness indicator field (116). The set identifier field (122) may be used to identify the set. For example, the value of the set 1 identifier field (122A) identifies set 1 (112A), the value of the set 2 identifier field (122B) identifies set 2 (112B), and the value of the set N identifier field (122B) identifies set N (112C). In one or more embodiments of the invention, the value of the set identifier field (122) is an integer between zero and the total number of sets minus one, inclusive.

Rather than having a separate set identifier field (122), the position of the hotness indicator field (116) may be used to identify the set (112). For example, because the set 1 hotness indicator field (116A) is first, the set 1 hotness indicator field (116A) may be presumed to correspond to set 1 (112). Similarly, because the set N hotness indicator field (116C) is last, the set N hotness indicator field (116C) may be presumed to correspond to the last set (i.e., set N (112C).

Regardless of whether the hotness indicator field is in a tag associated with the set or stored in a separate hotness indicator table, the hotness indicator field is compared against a pre-defined threshold. The threshold defines when the set is considered to be a hot set. In one or more embodiments of the invention, the threshold is an integer. When the value of the hotness indicator field is equal to the threshold, the value remains at the maximum value. In one or more embodiments of the invention, the threshold is specified as the number of bits allocated to the hotness indicator field. For example, if the hotness indicator field has three bits, then the threshold is seven (i.e., 2³-1). Periodically, the hotness indicator field of every set is reset. Further, the amount of the threshold may be dependent on the period at which the hotness indicator fields are reset.

In one or more embodiments of the invention, multiple thresholds may be used for different pre-fetch requests. In such embodiments of the invention, pre-fetch requests may be assigned a confidence level. The confidence level defines the likelihood that the pre-fetched data will actually be used.

For example, in a scenario in which data element A is stored next to data element B which is stored next to data element C, a compiler of a program or a hardware pre-fetcher may identify that data elements B and C are generally accessed in the program shortly after data element A is accessed in the program. Accordingly, the compiler may embed pre-fetch requests into the program after each instruction that uses data element A. Alternatively, the hardware pre-fetcher may issue pre-fetches after encountering an instruction that uses data element A. The pre-fetch requests instruct the processor to pre-fetch data elements B and C. Because B is directly next to A, the compiler or hardware pre-fetcher may assign a high confidence level to the pre-fetch of B. However, because C is not directly stored next to A, the compiler or hardware pre-fetcher may assign a low confidence level to the pre-fetch of C. Namely, it may be more likely that B is used when A is used than C is used when A is used. The multiple thresholds are used to allow pre-fetch requests which have a higher likelihood while not allowing pre-fetch requests with a lower likelihood.

Specifically, both a low confidence threshold and a high confidence threshold may be used. The low confidence threshold may be used for pre-fetches of data that have a lower confidence level. The high confidence threshold may be used for pre-fetches of data that have a higher confidence level. In one or more embodiments of the invention, the value of the high confidence threshold is greater than the value of the low confidence threshold. Namely, pre-fetches of data that are assigned a lower confidence level may not be performed even though pre-fetches of data that are assigned a higher confidence level are performed.

Figure 4:
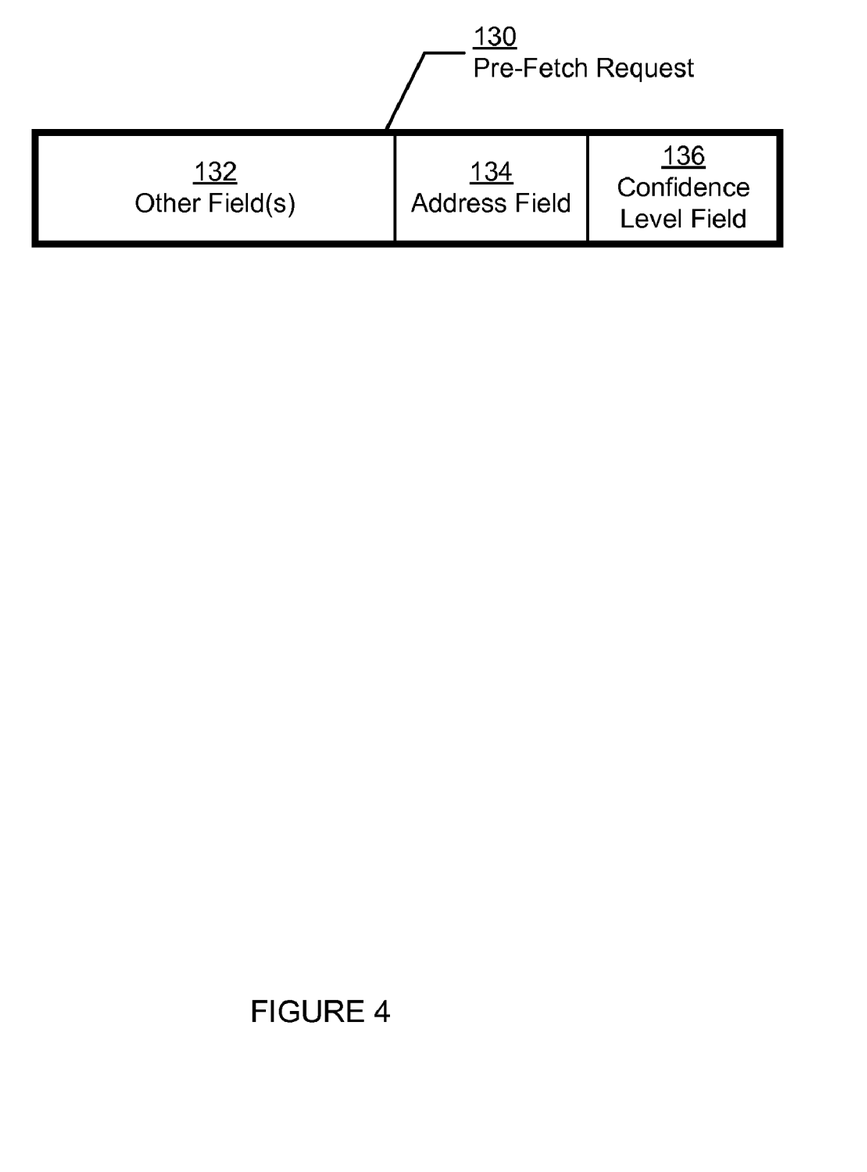
FIG. 4 shows a pre-fetch request in accordance with one or more embodiments of the invention.

FIG. 4 shows a pre-fetch requests (130) with the confidence level in accordance with one or more embodiments of the invention. Amongst other possible fields (132), the pre-fetch request may include an address field (134) and a confidence level field (136). The address field identifies a memory address to use to pre-fetch the data. The confidence level field (136) identifies the confidence level of the pre-fetch request. In one or more embodiments of the invention, the confidence level is set according to the algorithm used to generate the pre-fetch request. In particular, the confidence level assigned to the pre-fetch request is based on how the pre-fetch of the data is determined.

Although the above discusses having two confidence levels, additional confidence levels may exist without departing from the scope of the invention. For example, pre-fetch requests may be assigned a high confidence level, an intermediate confidence level, or a low confidence level in accordance with one or more embodiments of the invention. Each confidence level has a corresponding pre-defined threshold.

Figure 5:
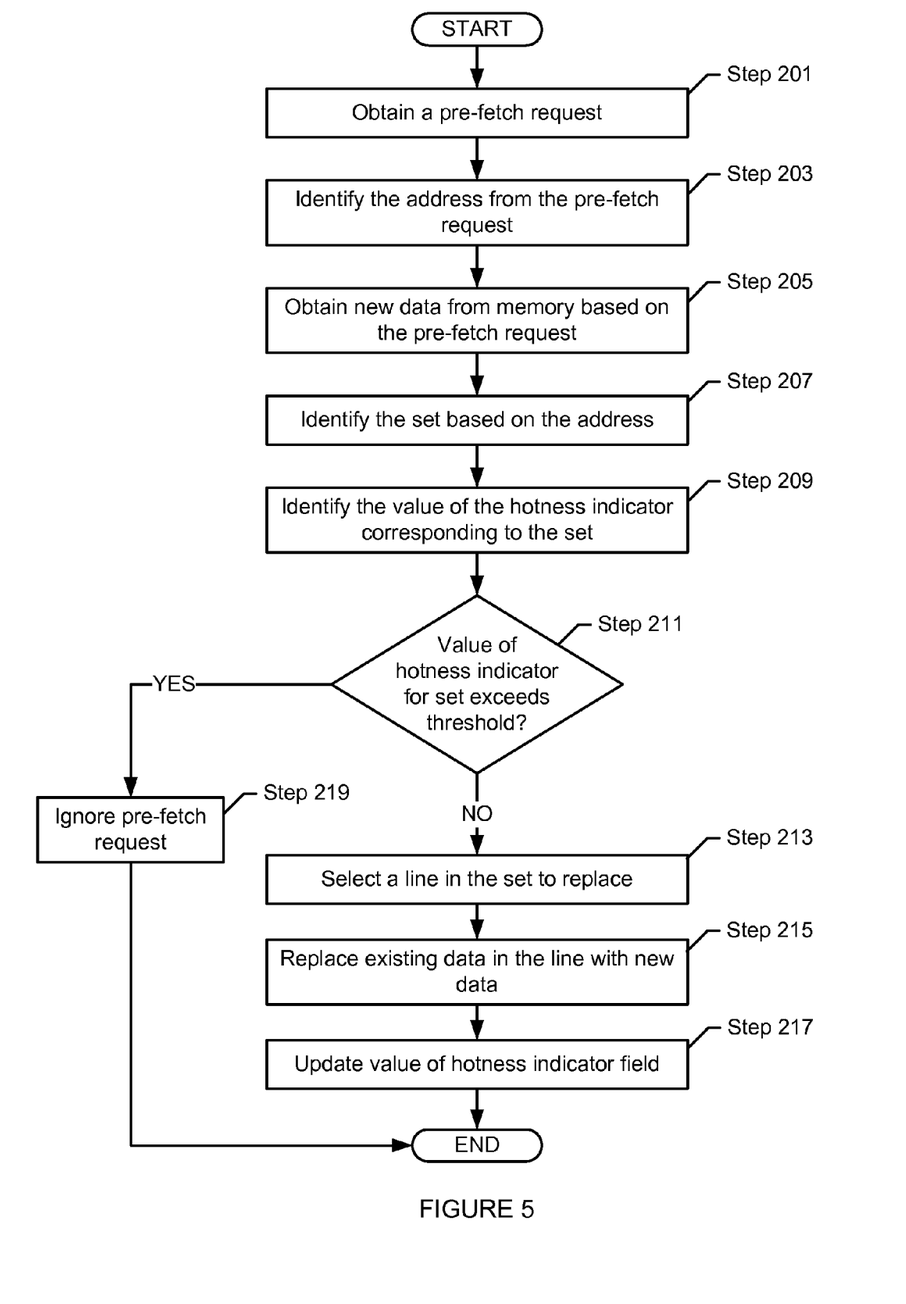
FIG. 5 shows a flowchart in accordance with one or more embodiments of the invention.

FIG. 5 shows a flowchart in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

In step 201, a pre-fetch request is obtained. Specifically, a processor core begins executing the pre-fetch request. During execution of the pre-fetch request, the address is identified from the pre-fetch request (step 203). Specifically, the field having the memory address is identified.

Further, new data is obtained from memory based on the pre-fetch request (step 205). When the new data is obtained may be based on implementation. For example, while the hotness indicator field is accessed, the pre-fetch request may be issued to memory to begin obtaining the new data. Under such an implementation, the time to determine whether to pre-fetch the new data does not add to the latency to access the main memory and obtained the pre-fetched data.

As alternative example, main memory may be accessed to obtain the new data only after the determination is made whether to pre-fetch the new data. Under the alternative example, the bandwidth for accessing memory is not exhausted on obtaining data that has the potential not to be used. Other heuristics may be used to decide when to obtain new data without departing from the scope of the invention.

In step 207, the set in the cache is identified based on the address. Identifying the set in the cache may be performed using any method known in the art. In step 209, the value of the hotness indicator corresponding to the set is identified. In one or more embodiments of the invention, the tag associated with the set is accessed. The hotness indicator field in the tag is identified. The value of the hotness indicator field is identified. Alternatively, using an identifier of the set, the hotness indicator table is accessed. The hotness indicator field for the set may be accessed using the identifier of the set. Accordingly, the value of the hotness indicator field is identified from the hotness indicator table.

In step 211, a determination is made as to whether the value of the hotness indicator for the set exceeds the threshold. Specifically, the value of the hotness indicator field is compared with the pre-defined threshold. When the confidence level is used, then the confidence level field may be accessed to identify the confidence level of the pre-fetch request. Based on the confidence level of the pre-fetch request, the threshold corresponding to the confidence level is identified. Accordingly, the value of the hotness indicator field is compared with the threshold corresponding to the confidence level of the pre-fetch request.

In step 213, if the value does not exceed the threshold, then the line to replace is selected. Selecting the line to replace may be performed using any method known in the art. For example, the line to replace may be based on a least recently used algorithm, a least frequently used algorithm, a most recently used algorithm, or any other replacement algorithm for the cache. Based on the replacement policy, in step 215, the existing data in the line is replaced with the new data. Further, the value of the hotness indicator field is updated to reflect the replacement of the data in the line (step 217). In one or more embodiments of the invention, the value of the hotness indicator field is incremented.

Alternatively, in step 219, if the value of the hotness indicator exceeds the pre-defined threshold, then the pre-fetch request is ignored. Namely, no line of the cache is replaced with the new data.

Figure 6A:
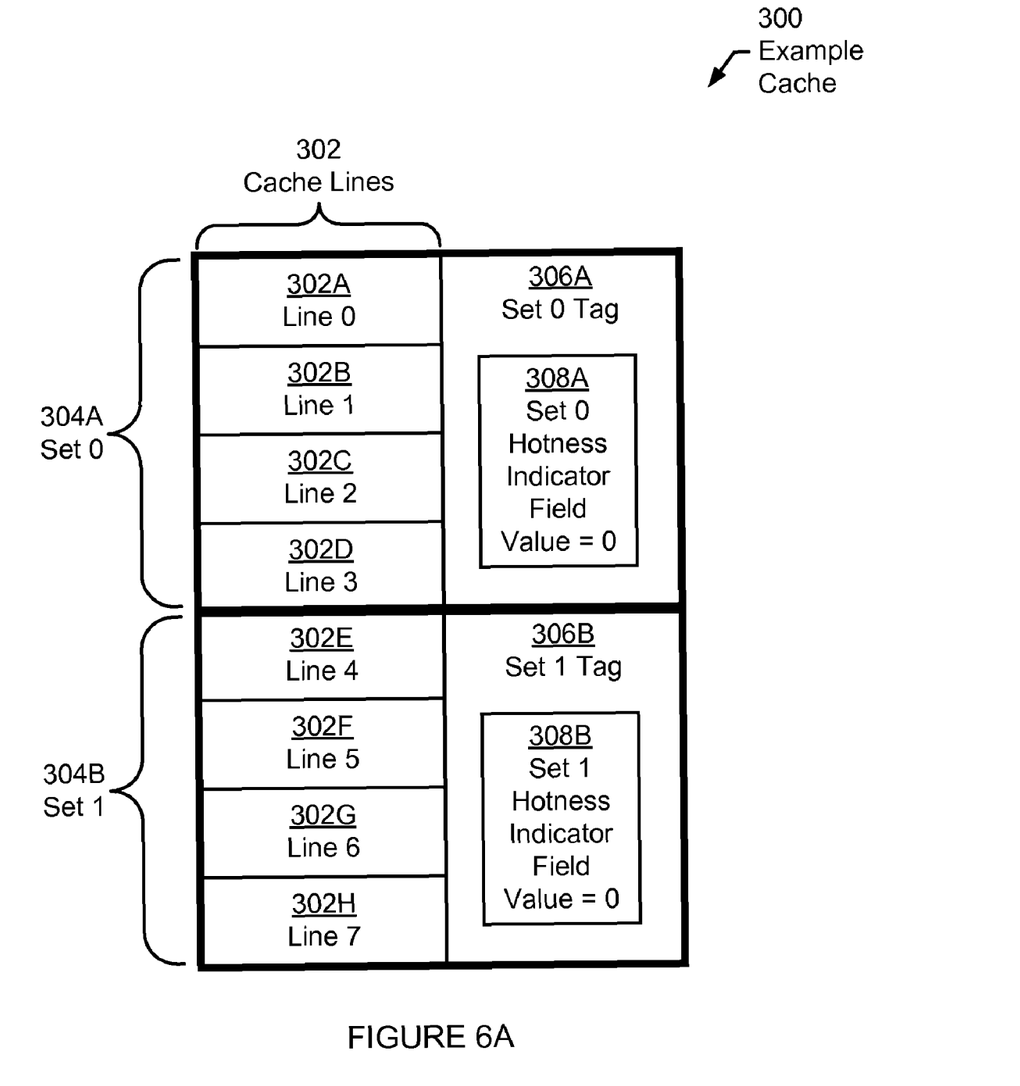
FIGS. 6A and 6B show an example in accordance with one or more embodiments of the invention.
Figure 6B:
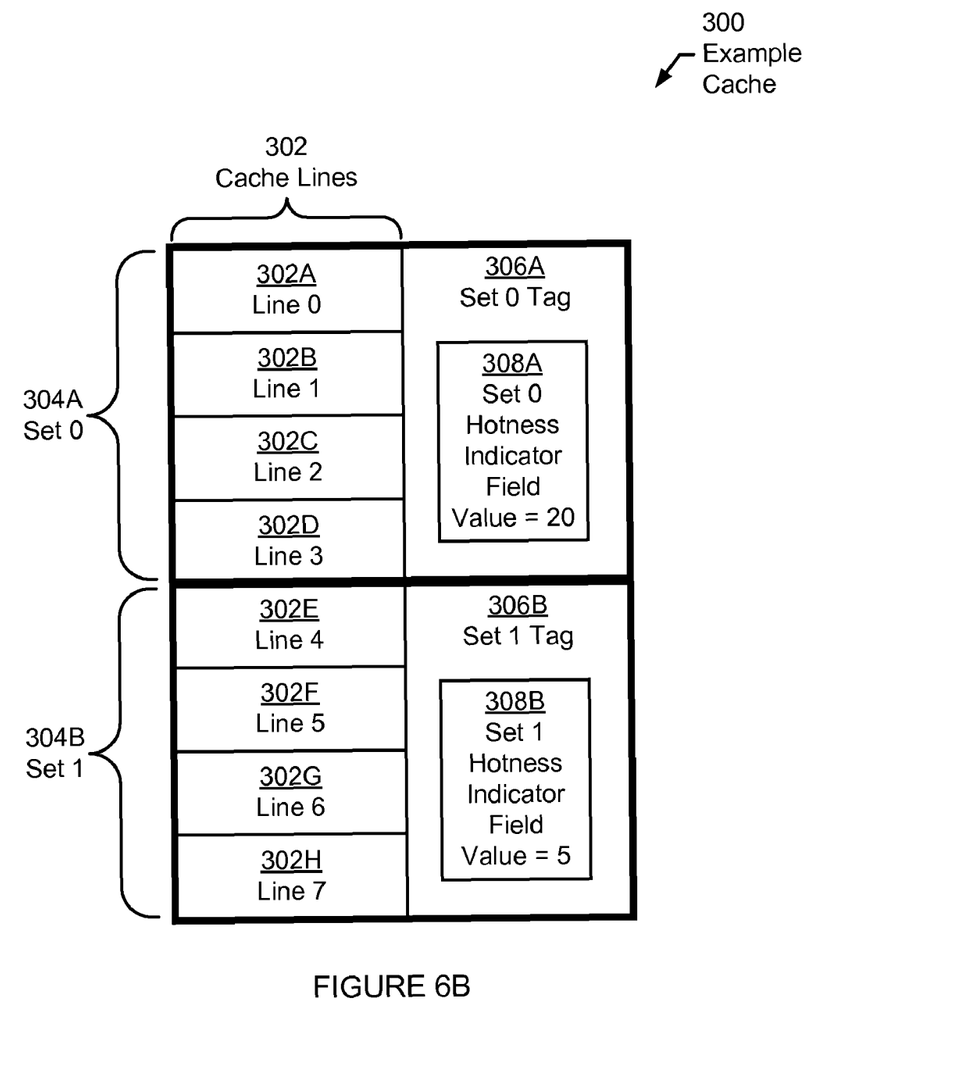

FIGS. 6A and 6B shows an example in accordance with one or more embodiments of the invention. The following example is for explanatory purposes only and not intended to limit the scope of the invention. In the example, consider the scenario that two cores of a multi-core processor access the same example cache (300). Further, the period to reset the values of the hotness indicator field is thirty time units, and the threshold is twenty. Additionally, as shown in FIG. 6A, consider the scenario in which the example cache (300) has eight cache lines (302) which are divided into two sets (304). Line 0 (302A), line 1 (302B), line 2 (302C), and line 3 (302D) belong to set 0 (304A). Line 4 (302E), line 5 (302F), line 6 (302G), and line 7 (302H) belong to set 1 (304B). Further, each set (304) has a corresponding tag (306) with a hotness indicator field (308).

As shown in FIG. 6A, the values of the hotness indicator fields (308) are initially set to zero. Within the first twenty time units, the first core issues memory instructions to make the following replacements: replace data in line 0 (302A) two times, replace data in line 1 (302B) three times, replace data in line 2 (302C) four times, replace data in line 3 (302D) two times, and replace data in line 6 (302G) two times. Within the first twenty time units, the second core issues memory instructions to make the following replacements: replace data in line 0 (302A) is replaced two times, replace data in line 1 (302B) is replaced one time, replace data in line 2 (302C) is replaced three times, replace data in line 3 (302D) is replaced three times, replace data in line 4 (302E) two times, and replace data in line 5 (302F) one time.

Accordingly, as shown in FIG. 6B, after the above replacements, the value of the hotness indicator field (308A) is twenty for set 0 (304A) and five for set 1 (304B). Within the next nine time units, the first core issues a pre-fetch request. Set 0 (304A) is identified as the set corresponding to the memory address in the pre-fetch request. Accordingly, the value of the set 0 hotness indicator field (308A) is identified. Because the value of the set 0 hotness indicator field (308A) is twenty and the threshold is twenty, set 0 (304A) is considered a hot set. Thus, the pre-fetch request is ignored.

Similarly, the second core issues a pre-fetch request. Set 1 (304B) is identified as the set corresponding to the memory address in the pre-fetch request. Accordingly, the value of the set 1 hotness indicator field (308B) is identified. Because the value of the set 1 hotness indicator field (308*b*) is five and the threshold is twenty, the pre-fetch request is performed. Existing data in a line (302E-302H) of set 1 (304B) is replaced with the new data requested by the pre-fetch request. Further, the value of the hotness indicator field (308B) for set 1 (304B) is incremented to six.

Continuing with the example, after thirty time units elapse, the value of the hotness indicator fields and the time counter are reset. Accordingly, the value of the hotness indicator fields after the reset is zero, as shown in FIG. 6A.

While the above description has discussed incrementing the value of the hotness indicator field and determining whether a threshold is reached, in alternative embodiments of the invention, the hotness indicator field may be decremented. In such alternative embodiments, the value of the hotness indicator field starts at the threshold and is determined to exceed the threshold when the value is less than zero. Further, if exceeding the threshold is based on the confidence level of the pre-fetch issue, then two hotness indicator fields may be used. The first hotness indicator field may decrement from the high confidence value and the second hotness indicator field may decrement from the low confidence value.

Those skilled in the art will further appreciate that the threshold may be offset by any number. In the case of incrementing the value of the hotness indicator field, the ending value is the threshold added to the offset. Thus, the set is identified as a hotset when the value of the hotness indicator field exceeds the ending value. In the case of decrementing the value of the hotness indicator field, the starting value of the hotness indicator field is the threshold added to the offset. The value of the hotness indicator field exceeds the threshold when the value is less than zero.

For example, in a scenario in which a set is considered a hot set when data in four lines are replaced during a certain period, in the case of incrementing the value of the hotness indicator field, if the offset is four, the ending value is eight. In the case of decrementing the value of the hotness indicator field, if the offset is nine, the starting value is thirteen.

Advantages of the invention may include one or more of the following. Embodiments of the invention are able to easily identify which sets are hot sets. Embodiments of the invention further prevent pre-fetches to hot sets and therefore may increase processor performance. Further, by storing the hotness indicator field on the cache, embodiments of the invention prevent pre-fetches to hot-sets by cores that share the same cache.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for pre-fetching data comprising:
    obtaining a pre-fetch request, wherein the pre-fetch request identifies new data to pre-fetch from memory and store in a cache;
    identifying a set in the cache to store the new data;
    identifying a value of a hotness indicator for the set, wherein the value of the hotness indicator defines a number of replacements of at least one line in the set;

determining whether the value of the hotness indicator exceeds a predefined threshold;

storing the new data in the set when the value of the hotness indicator does not exceed the pre-defined threshold; and resetting the hotness indicator for each set in the cache after a pre-defined duration of time, wherein the pre-defined threshold is set according to the length of the pre-defined duration of time.

2. The method of claim 1, further comprising:

ignoring the pre-fetch request when the value of the hotness indicator exceeds the pre-defined threshold.

3. The method of claim 1, wherein identifying the value of the hotness indicator comprises:

accessing a tag associated with the set; and obtaining the value of the hotness indicator from the tag.

4. The method of claim 1, wherein identifying the value of the hotness indicator comprises:

accessing a hotness indicator table in the cache using an identifier of the set; and obtaining a value corresponding to the identifier of the set.

5. The method of claim 1, further comprising:

identifying a confidence level of the pre-fetch request, wherein determining whether the value of the hotness indicator exceeds the predefined threshold comprises:

determining whether the value of the hotness indicator exceeds a low confidence threshold when the confidence level is set as low; and determining whether the value of the hotness indicator exceeds a high confidence threshold when the confidence level is set as high.

6. The method of claim 5, wherein the confidence level is stored in a field of the pre-fetch request.

7. A computer system comprising:

a processor;

a cache; and memory, wherein the computer system is configured to:

obtain a pre-fetch request, wherein the pre-fetch request identifies new data to pre-fetch from the memory and store in the cache;

identify a set in the cache to store the new data;

identify a value of a hotness indicator for the set, wherein the value of the hotness indicator defines a number of replacements of at least one line in the set;

determine whether the value of the hotness indicator exceeds a predefined threshold;

store the new data in the set when the value of the hotness indicator does not exceed the pre-defined threshold; and reset the hotness indicator for each set in the cache after a pre-defined duration of time, wherein the pre-defined threshold is set according to the length of the pre-defined duration of time.

8. The computer system of claim 7, wherein the computer system is further configured to:

ignore the pre-fetch request when the value of the hotness indicator exceeds the pre-defined threshold.

9. The computer system of claim 7, wherein identifying the value of the hotness indicator comprises:

accessing a tag associated with the set; and obtaining the value of the hotness indicator from the tag.

10. The computer system of claim 7, wherein identifying the value of the hotness indicator comprises:

accessing a hotness indicator table in the cache using an identifier of the set; and obtaining a value corresponding to the identifier of the set.

11. The computer system of claim 7, wherein the computer system is further configured to:

identify a confidence level of the pre-fetch request, wherein determining whether the value of the hotness indicator exceeds the predefined threshold comprises:

determining whether the value of the hotness indicator exceeds a low confidence threshold when the confidence level is set as low; and determining whether the value of the hotness indicator exceeds a high confidence threshold when the confidence level is set as high.

12. The computer system of claim 11, wherein the confidence level is stored in a field of the pre-fetch request.

13. A chip comprising:

a plurality of cores; and a cache, wherein the chip is configured to:

obtain a pre-fetch request, wherein the pre-fetch request identifies new data to pre-fetch from memory and store in the cache;

identify a confidence level of the pre-fetch request, identify a set in the cache to store the new data;

identify a value of a hotness indicator for the set, wherein the value of the hotness indicator defines a number of replacements of at least one existing line in the set;

determine whether the value of the hotness indicator exceeds a predefined threshold, wherein determining whether the value of the hotness indicator exceeds the predefined threshold comprises:

determining whether the value of the hotness indicator exceeds a low confidence threshold when the confidence level is set as low; and determining whether the value of the hotness indicator exceeds a high confidence threshold when the confidence level is set as high; and store the new data in the cache when the value of the hotness indicator does not exceed the pre-defined threshold.

14. The chip of claim 13, wherein identifying the value of the hotness indicator comprises:

accessing a tag associated with the set; and obtaining the value of the hotness indicator from the tag.

15. The chip of claim 13, wherein identifying the value of the hotness indicator comprises:

accessing a hotness indicator table in the cache using an identifier of the set; and obtaining a value corresponding to the identifier of the set.

* * * * *